(12) United States Patent
Hotaka

(10) Patent No.: US 12,498,335 B2
(45) Date of Patent: Dec. 16, 2025

(54) X-RAY FOCAL SPOT SHAPE EVALUATION DEVICE AND X-RAY FOCAL SPOT SHAPE EVALUATION METHOD

(71) Applicant: HAMAMATSU PHOTONICS K.K., Hamamatsu (JP)

(72) Inventor: Hisaya Hotaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 179 days.

(21) Appl. No.: 18/572,562

(22) PCT Filed: Jun. 27, 2022

(86) PCT No.: PCT/JP2022/025514
§ 371 (c)(1),
(2) Date: Dec. 20, 2023

(87) PCT Pub. No.: WO2023/276927
PCT Pub. Date: Jan. 5, 2023

(65) Prior Publication Data
US 2024/0288387 A1   Aug. 29, 2024

(30) Foreign Application Priority Data
Jun. 28, 2021   (JP) ................... 2021-106343

(51) Int. Cl.
*G01N 23/041* (2018.01)
*G01N 23/046* (2018.01)
(52) U.S. Cl.
CPC ......... *G01N 23/041* (2018.02); *G01N 23/046* (2013.01)

(58) Field of Classification Search
CPC ........................... G01N 23/041; G01N 23/046
See application file for complete search history.

(56) References Cited

U.S. PATENT DOCUMENTS 6,404,848 B1 * 6/2002 Ishisaka ................. A61B 6/589
378/70
7,190,761 B1 * 3/2007 Honda ................. G01N 23/041
378/62
(Continued)

FOREIGN PATENT DOCUMENTS

JP          H09-17342 A       1/1997
JP          2004-535559 A    11/2004
(Continued)

OTHER PUBLICATIONS

Extended European Search Report issued on May 15, 2025 in corresponding European patent application 22833074.2.
(Continued)

*Primary Examiner* — Hugh Maupin
(74) *Attorney, Agent, or Firm* — Faegre Drinker Biddle & Reath LLP

(57) ABSTRACT

An X-ray focal spot shape evaluation apparatus is an apparatus for evaluating an X-ray focal spot shape including an X-ray focal spot size on a target of an X-ray source, and includes an imaging unit and an operation unit. The imaging unit acquires a phase contrast image in a range including an edge of an object disposed on a propagation path of X-rays generated on the target of the X-ray source. The operation unit evaluates the X-ray focal spot shape on the target based on at least the phase contrast image, a linear attenuation coefficient of the object, and a refractive index of the object.

14 Claims, 16 Drawing Sheets

(56) References Cited

U.S. PATENT DOCUMENTS

| | | | |
|---|---|---|---|
| 7,249,886 B1* | 7/2007 | Chao | A61B 6/037 378/207 |
| 2003/0123611 A1* | 7/2003 | Ohara | A61B 6/4092 378/98.8 |
| 2010/0158318 A1 | 6/2010 | Snoeren | |
| 2015/0146848 A1* | 5/2015 | Gupta | H01J 35/045 378/57 |
| 2018/0078229 A1 | 3/2018 | Wang | |
| 2021/0142502 A1* | 5/2021 | Chen | G06T 7/62 |

FOREIGN PATENT DOCUMENTS

| | | | |
|---|---|---|---|
| JP | 2006-026425 A | 2/2006 | |
| JP | 2020-057163 A | 4/2020 | |

OTHER PUBLICATIONS

Edwin F. Donnelly et al., "Quantification of the effect of system and object parameters on edge enhancement in phase-contrast radiography", Medical Physics, AIP, Melville, NY, US, vol. 30, No. 11,, Jan. 1, 2003, p. 2888-p. 2896, XP002458158.

Ishisaka, Akira, et al., "A New Method of Analyzing Edge Effect in Phase Contrast Imaging with Incoherent X-rays," Optical Review, vol. 7, No. 6, 2000, pp. 566-572.

International Preliminary Report on Patentability mailed Jan. 11, 2024 for PCT/JP2022/025514.

* cited by examiner

*Fig.11*

| TUBE VOLTAGE [kV] | TUBE CURRENT [μA] |
|---|---|
| 15 | 100 |
| 20 | 40 |
| 25 | 30 |
| 30 | 20 |
| 35 | 15 |
| 40 | 15 |

# X-RAY FOCAL SPOT SHAPE EVALUATION DEVICE AND X-RAY FOCAL SPOT SHAPE EVALUATION METHOD

TECHNICAL FIELD

The present disclosure relates to an apparatus and a method for evaluating an X-ray focal spot shape on a target of an X-ray source.

BACKGROUND ART

JIS Z4704 of the Japanese Industrial Standards defines a slit camera method and a pinhole camera method as a method for evaluating an X-ray focal spot size on a target of a medical X-ray source. In the slit camera method, an intensity profile of X-rays passed through a slit out of X-rays output from the X-ray source is acquired using a shielding object having the slit which is long in one direction, and the focal spot size is obtained based on the acquired intensity profile. In the pinhole camera method, an intensity profile of X-rays passed through a pinhole out of X-rays output from the X-ray source is acquired using a shielding object having the pinhole, and the focal spot size is obtained based on the acquired intensity profile.

JIS Z4615 defines a method for evaluating an X-ray focal spot size on a target of an industrial X-ray source. However, this standard only defines an evaluation method for the focal spot size of 300 μm or more, and does not define an evaluation method for the focal spot size of less than 300 μm.

A knife edge method is also known as a method for measuring the focal spot size on the target of the X-ray source. In the knife edge method, a part of a beam cross-section of the X-rays output from the X-ray source is shielded by a shielding object to acquire an edge image, and the focal spot size is obtained based on the edge image.

In Non Patent Document 1, it is described that, when a phase contrast image in a range including an edge of a cylindrical object disposed on a propagation path of the X-rays is acquired, a profile shape of an X-ray intensity distribution in a range near a position corresponding to the edge in the phase contrast image has a correlation with the focal spot size. When the above correlation is used, it is considered that the focal spot size can be obtained based on the profile shape of the X-ray intensity distribution in the range near the edge corresponding position in the phase contrast image. Hereinafter, the focal spot size measurement method based on the description in Non Patent Document 1 is referred to as a "comparative example".

CITATION LIST

Patent Literature

Patent Document 1: Japanese Patent Application Laid-Open Publication No. 2020-57163

Non Patent Literature

Non Patent Document 1: Akira Ishisaka, et al., "A New Method of Analyzing Edge Effect in Phase Contrast Imaging with Incoherent X-rays", Optical Review, Vol. 7 No. 6, pp. 566-572, 2000

SUMMARY OF INVENTION

Technical Problem

The slit camera method and the pinhole camera method have limitations in reducing a slit width and a pinhole diameter, and thus, it is difficult to use the methods when the focal spot size is small, and the methods may be effectively used when the focal spot size is large. On the other hand, the knife edge method can be used even when the focal spot size is small.

In the slit camera method, the pinhole camera method, and the knife edge method described above, it is necessary for the shielding object to have a sufficient thickness to sufficiently shield the X-rays, and further, it is necessary to process a cross-section of the slit, the pinhole, or the edge with high accuracy. However, it is not easy to process the edge of the shielding object which is thick as described above with high accuracy.

Further, in the above methods, in order to measure the focal spot size with high accuracy, it is necessary to dispose the shielding object on the X-ray propagation path with high accuracy, but it is not easy to dispose the object as described above. A material having a large X-ray absorption (metal having a high atomic number) is used as a material of the shielding object, but the above material is expensive.

It is expected that the measurement method of the comparative example based on the description in Non Patent Document 1 can solve the problems of the slit camera method, the pinhole camera method, or the knife edge method. However, the present inventor attempted to measure the focal spot size using the measurement method of the comparative example, and found that the measurement method has the following problems.

That is, it is difficult to use the measurement method of the comparative example when the X-ray absorption of the cylindrical object is large. Further, in the measurement method of the comparative example, it is considered that distortion of the shape of the cylindrical object and variation of the curvature of the surface greatly affect the measurement accuracy, and thus, it is necessary to process the cylindrical object with high accuracy, but the processing described above is not easy.

An object of the present invention is to provide an apparatus and a method capable of easily evaluating a focal spot shape including an X-ray focal spot size on a target of an X-ray source.

Solution to Problem

An embodiment of the present invention is an X-ray focal spot shape evaluation apparatus. The X-ray focal spot shape evaluation apparatus is an apparatus for evaluating an X-ray focal spot shape on a target of an X-ray source, and includes an imaging unit for acquiring a phase contrast image in a range including an edge of an object disposed on a propagation path of X-rays generated on the target; and an operation unit for evaluating the X-ray focal spot shape based on at least the phase contrast image, a linear attenuation coefficient of the object, and a refractive index of the object.

An embodiment of the present invention is an X-ray focal spot shape evaluation method. The X-ray focal spot shape evaluation method is a method for evaluating an X-ray focal spot shape on a target of an X-ray source, and includes an imaging step of acquiring, by an imaging unit, a phase contrast image in a range including an edge of an object disposed on a propagation path of X-rays generated on the target; and an operation step of evaluating the X-ray focal spot shape based on at least the phase contrast image, a linear attenuation coefficient of the object, and a refractive index of the object.

Advantageous Effects of Invention

According to the embodiments of the present invention, it is possible to easily evaluate a focal spot shape including an X-ray focal spot size on a target of an X-ray source.

BRIEF DESCRIPTION OF DRAWINGS

FIG. 11 is a table showing a tube voltage and a tube current in an experiment.

DESCRIPTION OF EMBODIMENTS

Hereinafter, embodiments of an X-ray focal spot shape evaluation apparatus and an X-ray focal spot shape evaluation method will be described in detail with reference to the accompanying drawings. In the description of the drawings, the same elements will be denoted by the same reference signs, and redundant description will be omitted. The present invention is not limited to these examples.

Figure 1:
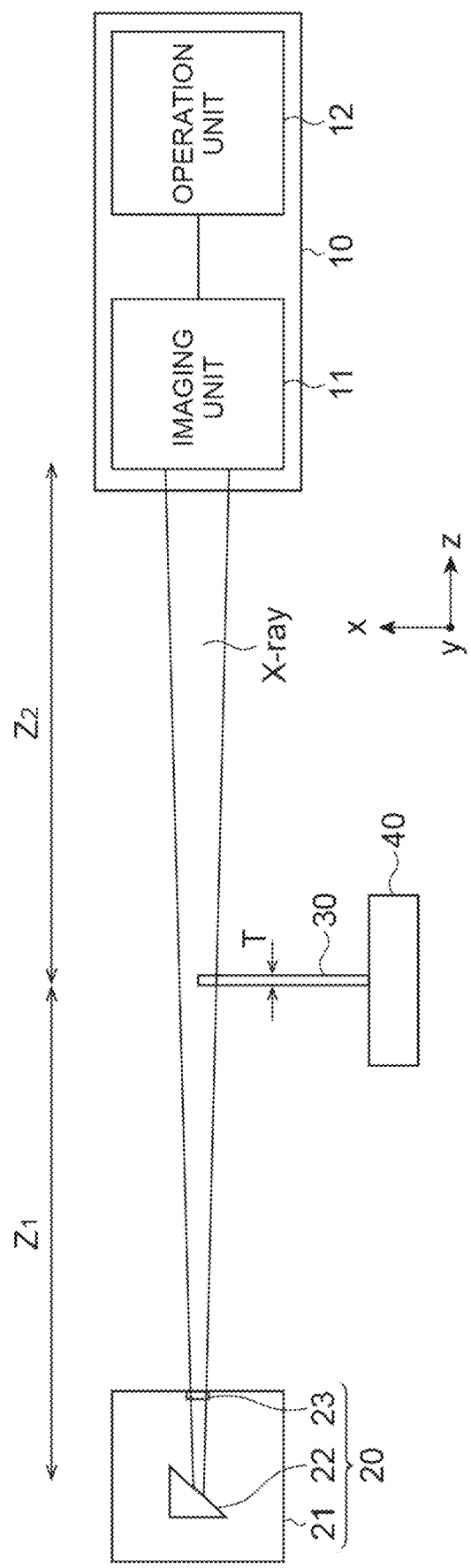
FIG. 1 is a diagram illustrating a configuration of an X-ray focal spot shape evaluation apparatus 10.

FIG. 1 is a diagram illustrating a configuration of an X-ray focal spot shape evaluation apparatus 10. In this diagram, an X-ray source 20, an object 30, and a holding unit 40 are also illustrated, in addition to the X-ray focal spot shape evaluation apparatus 10. The X-ray focal spot shape evaluation apparatus 10 is an apparatus for evaluating an X-ray focal spot shape including an X-ray focal spot size on a target 22 of the X-ray source 20, and includes an imaging unit 11 and an operation unit 12.

The X-ray source 20 includes the target 22 being provided inside a housing 21, and a window 23 for emitting X-rays generated by electron beam irradiation on the target 22 to the outside is provided in a part of the housing 21. The object 30 is disposed on an X-ray propagation path between the X-ray source 20 and the imaging unit 11. It is preferable that the object 30 has a flat plate shape with a uniform thickness, and in this case, it is easy to process the object 30.

The object 30 is a phase object which allows a part of the X-rays to pass therethrough. The object 30 may have any thickness and any material as long as it can transmit a part of the X-rays. The object 30 is, for example, a metal foil or a resin film. The holding unit 40 holds the object 30, and adjusts a position and an orientation of the object 30. The holding unit 40 holds the object 30 such that the object 30 of the flat plate shape is perpendicular to the X-ray propagation direction, and an edge of the object 30 is located in an X-ray beam cross-section.

The imaging unit 11 acquires a phase contrast image in a range including the edge of the object 30 disposed on the propagation path of the X-rays generated on the target 22 of the X-ray source 20. The imaging unit 11 is disposed apart from the object 30 by a distance necessary for acquiring the phase contrast image of the object 30. The imaging unit 11 outputs data of the phase contrast image to the operation unit 12.

The imaging unit 11 may be any unit as long as it can acquire a two-dimensional X-ray image. The imaging unit 11 may be an X-ray CCD camera having sensitivity to the X-rays. Further, the imaging unit 11 may have a configuration including a scintillator for generating scintillation light by X-ray incidence, and a CCD camera for imaging a scintillation light generation distribution in the scintillator.

The operation unit 12 inputs the data of the phase contrast image output from the imaging unit 11. The operation unit 12 evaluates the X-ray focal spot shape on the target 22 based on at least the phase contrast image, a linear attenuation coefficient of the object 30, and a refractive index of the object 30. The operation unit 12 includes a CPU for performing processing such as the evaluation described above, a memory (RAM, ROM, hard disk drive, or the like) for storing various parameters and processing results, a display for displaying images and processing results, and the like. The operation unit 12 may be a computer.

An X-ray focal spot shape evaluation method is a method for evaluating the X-ray focal spot shape including the X-ray focal spot size on the target 22 of the X-ray source 20, and includes an imaging step and an operation step.

In the imaging step, the phase contrast image in the range including the edge of the object 30 disposed on the propagation path of the X-rays generated on the target 22 of the X-ray source 20 is acquired by the imaging unit 11. The imaging step can be performed by the imaging unit 11. In the operation step, the X-ray focal spot shape on the target 22 is evaluated based on at least the phase contrast image, the linear attenuation coefficient of the object 30, and the refractive index of the object 30. The operation step can be performed by the operation unit 12.

In the imaging step, a background image may be acquired by the imaging unit 11 in a state in which the object 30 is not disposed on the propagation path of the X-rays, and in the operation step, the phase contrast image may be corrected based on the background image, and the X-ray focal spot shape may be evaluated based on the corrected phase contrast image. The order of acquisition of the phase contrast image and the background image in the imaging step is set arbitrary.

In the background image, when the background light intensity is non-uniform in a range near a position corresponding to the edge of the object 30, the accuracy of the evaluation of the X-ray focal spot shape deteriorates, and therefore, in order to avoid the above situation, it is preferable to correct the phase contrast image by dividing by the background image. On the other hand, in the background image, when it can be considered that the background light intensity is uniform in the range near the position corresponding to the edge of the object 30, the correction described above may not be performed.

As illustrated in FIG. 1, an xyz orthogonal coordinate system is set for convenience of explanation. The X-ray propagation direction from the target 22 to the imaging unit 11 is set to the z direction, the edge of the object 30 is set to be parallel to the y direction, and the edge of the object 30 is set to be perpendicular to the x direction.

The linear attenuation coefficient of the object 30 is set to $\mu$. The refractive index of the object 30 is set to $1-\delta$. In general, $\delta$ is a very small positive value (for example, about $10^{-6}$) in the X-ray region. The values of $\mu$ and $\delta$ are determined by an X-ray energy and a material of the object 30. A thickness of the object 30 is set to T. A distance between an X-ray generation position on the target 22 and the object 30 is set to $z_1$. A distance between the object 30 and an imaging plane of the imaging unit 11 is set to $z_2$. In addition, $z_1 \gg T$ and $z_2 \gg T$ can be satisfied. An optical magnification M is represented by the following Formula (1).

[Formula 1]

$$M = \frac{z_1 + z_2}{z_1} \quad (1)$$

The X-ray intensity distribution when the X-rays are generated on the target 22 is set to be represented by a function F(x, y). The above X-ray intensity distribution is a distribution obtained when the target 22 is viewed from the imaging unit 11. A function obtained by line integrating the function F(x, y) in the y direction is set to S(x) (the following Formula (2)). The function S(x) reflects the focal spot shape in the x direction, and thus, the focal spot shape in the x direction can be evaluated when the function S(x) is known.

[Formula 2]

$$S(x) = \int_{-\infty}^{\infty} F(x, y) dy \quad (2)$$

In the phase contrast image acquired by the imaging unit 11, the intensity distribution I(x) near the position corresponding to the edge of the object 30 is represented by the following Formula (3). $x_0$ is an x coordinate value of the position corresponding to the edge of the object 30 in the phase contrast image.

[Formula 3]

$$I(x) = \int_x^{\infty} S(t)dt + \exp(-\mu T) \cdot \int_{-\infty}^{x} S(t)dt + \frac{\delta z_2}{\mu M}[1 - \exp(-\mu T)]\frac{dS(x)}{dx} \quad (3)$$

Figure 2:
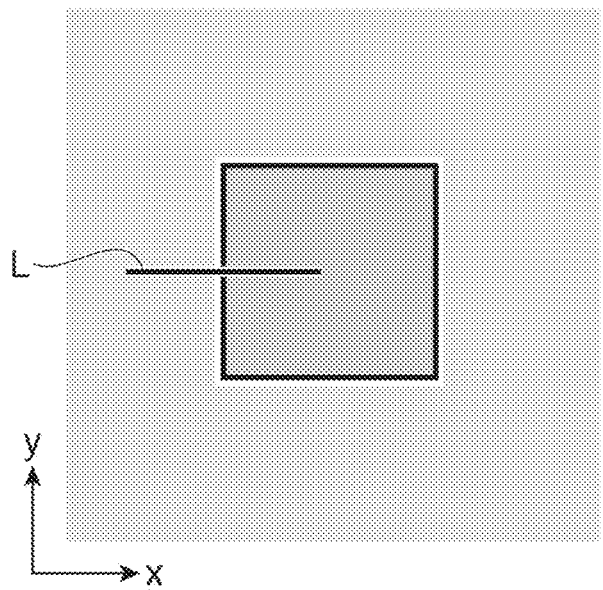
FIG. 2 is a diagram schematically illustrating a phase contrast image.

FIG. 2 is a diagram schematically illustrating the phase contrast image. As illustrated in this diagram, the intensity distribution I(x) represents the X-ray intensity at each position on a straight line L which is perpendicular to the edge in the phase contrast image.

Figure 3:
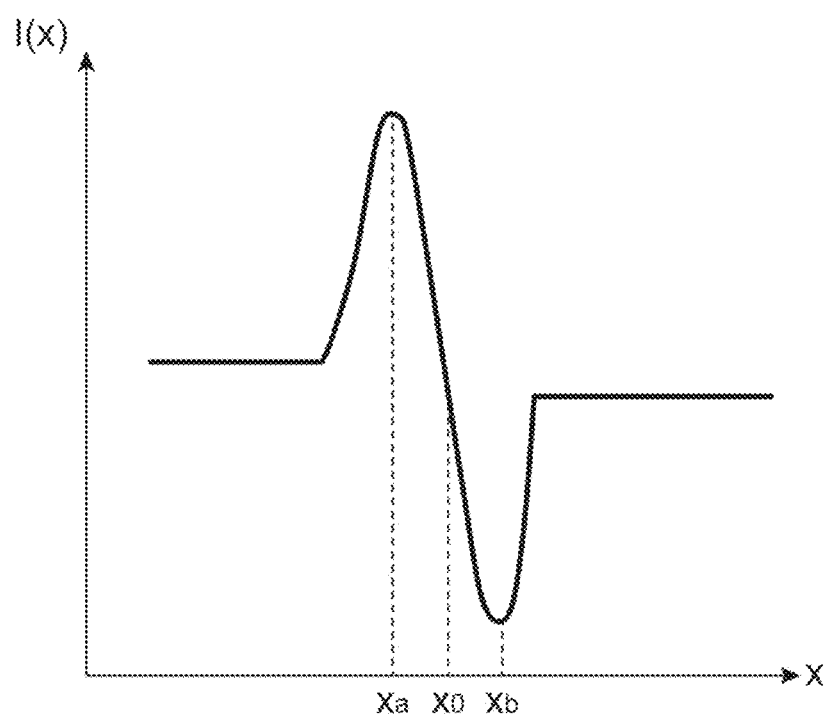
FIG. 3 is a diagram schematically illustrating an intensity distribution I(x) in the vicinity of an edge of the phase contrast image.

FIG. 3 is a diagram schematically illustrating the intensity distribution I(x) in the vicinity of the edge in the phase contrast image. As illustrated in this diagram, in the phase contrast image, with respect to the edge position $x_0$, there is a position $x_a$ where I(x) becomes the maximum value on one side, and there is a position $x_b$ where I(x) becomes the minimum value on the other side.

When S(x) is a Gaussian function represented by the following Formula (4), I(x) is represented by the following Formula (5). $\sigma$ is a parameter representing the X-ray focal spot shape or the X-ray focal spot size on the target 22. erf on the right side of Formula (5) is an error function. A second term in two terms on the right side of Formula (5) is sensitive to the value of $\sigma$.

[Formula 4]

$$S(x) = \frac{1}{\sqrt{2\pi\sigma^2}} \exp\left(-\frac{x^2}{2\sigma^2}\right) \quad (4)$$

[Formula 5]

$$I(x) = \frac{1}{2}\left\{1 - \mathrm{erf}\left(\frac{x-x_0}{(M-1)\sqrt{2\sigma^2}}\right) + \exp(-\mu T) \cdot \left[1 + \mathrm{erf}\left(\frac{x-x_0}{(M-1)\sqrt{2\sigma^2}}\right)\right]\right\} - \frac{\delta z_2}{\mu M}[1 - \exp(-\mu T)]\frac{x-x_0}{(M-1)^3\sqrt{2\pi\sigma^6}}\exp\left(-\frac{(x-x_0)^2}{2(M-1)^2\sigma^2}\right) \quad (5)$$

The difference between the x coordinate value $x_a$ of the position where Formula (5) is the maximum value and the x coordinate value $x_b$ of the position where Formula (5) is the minimum value (distance between the maximum intensity position and the minimum intensity position) is set to $\Delta x_{edge}$. In this case, $\sigma$ is represented by the following Formula (6) by using $\Delta x_{edge}$. In addition, the X-ray focal spot size (full width at half maximum) on the target 22 is often defined by $2.35\sigma$.

[Formula 6]

$$\sigma = \left(1 - \frac{1}{M}\right)\left\{\frac{\delta z_2}{2\mu}\left\{-1 + \left[1 + \frac{\mu}{\delta z_2 M}(\Delta x_{edge})^2\right]^{1/2}\right\}\right\}^{1/2} \quad (6)$$

Figure 4:
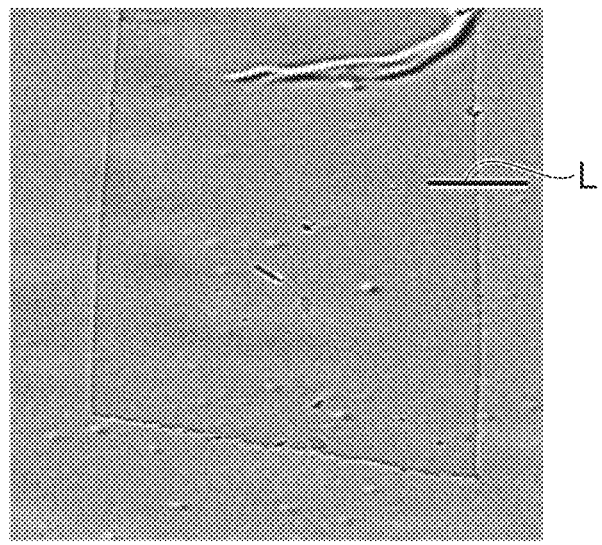
FIG. 4 is a diagram showing an example of the phase contrast image acquired by an imaging unit 11.
Figure 5:
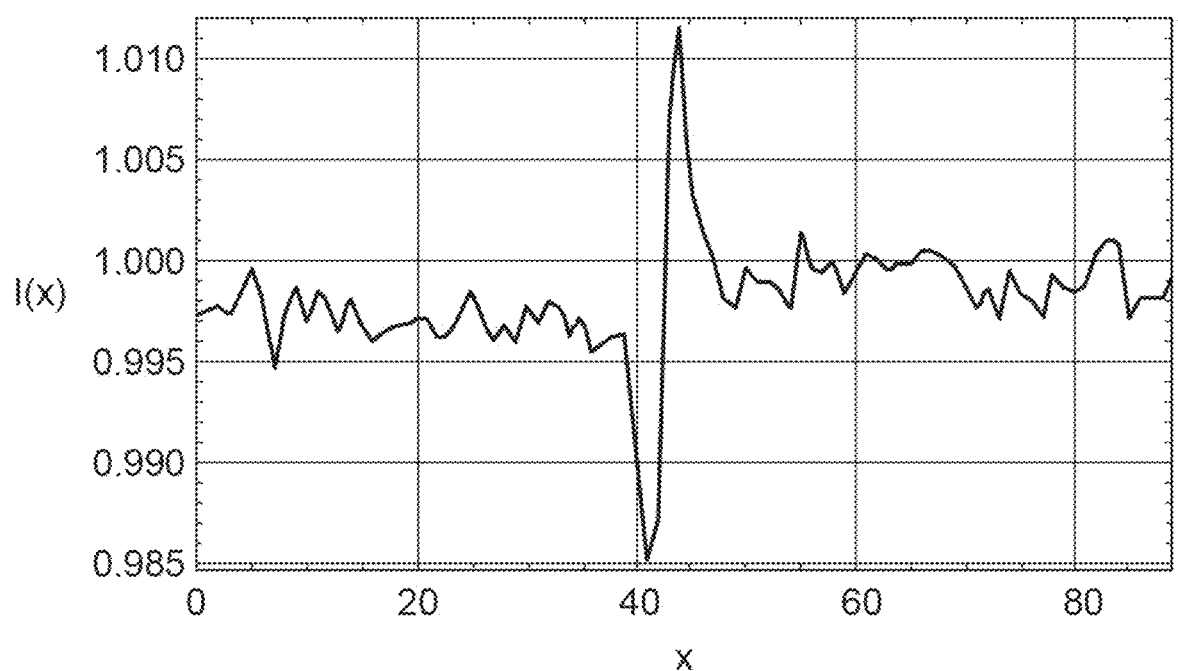
FIG. 5 is a diagram showing the intensity distribution I(x) on a straight line L perpendicular to the edge in the phase contrast image shown in FIG. 4.

FIG. 4 is a diagram showing an example of the phase contrast image acquired by the imaging unit 11. FIG. 5 is a diagram showing the intensity distribution I(x) on the straight line L perpendicular to the edge in the phase contrast image shown in FIG. 4. As shown in this diagram, in the phase contrast image, with respect to the edge, there is a position where I(x) is the maximum value on one side, and there is a position where I(x) is the minimum value on the other side.

Figure 6:
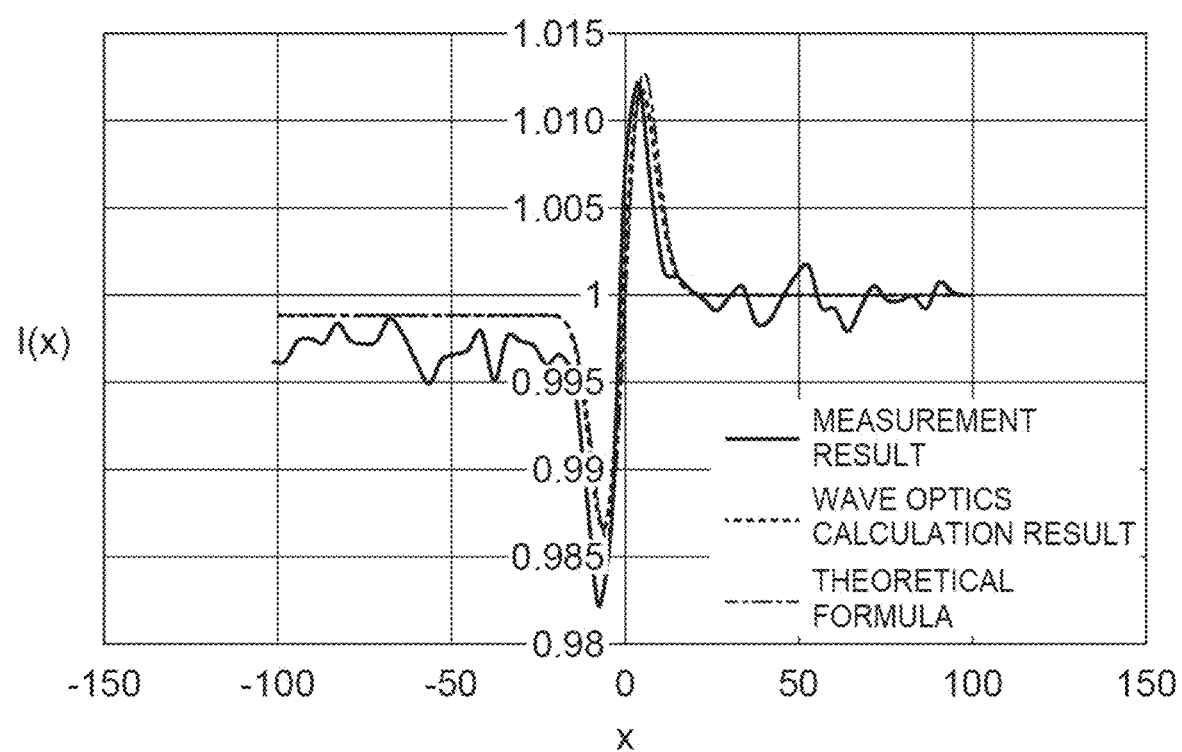
FIG. 6 is a diagram showing and comparing the measured intensity distribution I(x) acquired from the phase contrast image acquired by the imaging unit 11, the intensity distribution I(x) obtained by a wave optics calculation, and the intensity distribution I(x) obtained by a theoretical formula of Formula (5).

FIG. 6 is a diagram showing and comparing the intensity distribution I(x) of the measurement acquired from the phase contrast image acquired by the imaging unit 11, the intensity distribution I(x) obtained by a wave optics calculation, and the intensity distribution I(x) obtained by a theoretical formula of Formula (5). As shown in this diagram, the intensity distribution I(x) obtained by the theoretical formula of Formula (5) is in good agreement with both the measured intensity distribution I(x) and the intensity distribution I(x) obtained by the wave optics calculation.

Figure 7:
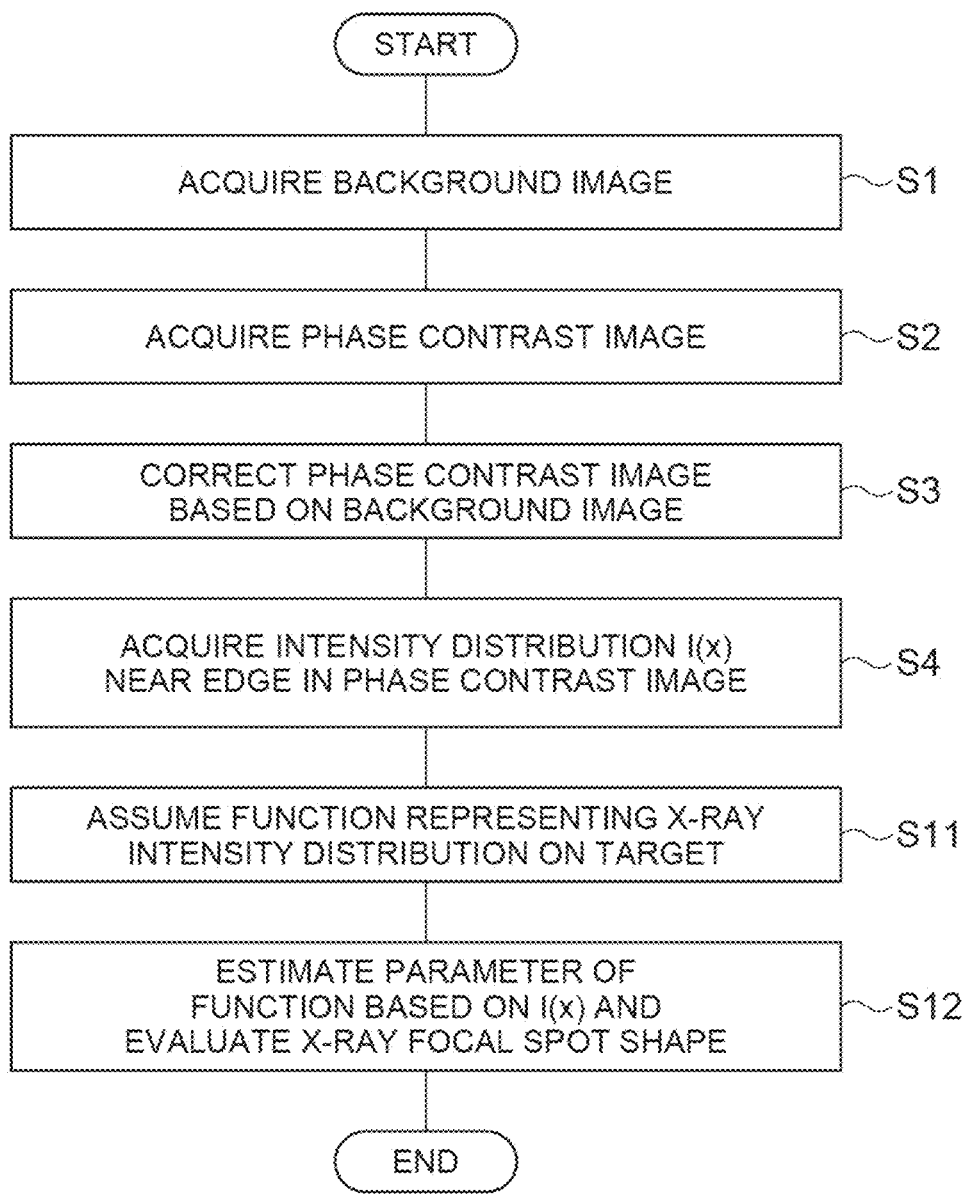
FIG. 7 is a flowchart illustrating a first example of a X-ray focal spot shape evaluation method.

Next, examples of a flow of the X-ray focal spot shape evaluation method will be described with reference to FIG. 7 to FIG. 9. FIG. 7 is a flowchart illustrating a first example of the X-ray focal spot shape evaluation method. The imaging step includes steps S1 and S2. The operation step includes steps S3, S4, S11, and S12.

In the step S1, the background image is acquired by the imaging unit 11 in a state where the object 30 is not disposed on the propagation path of the X-rays. In the step S2, the phase contrast image in the range including the edge of the object 30 disposed on the propagation path of the X-rays generated on the target 22 of the X-ray source 20 is acquired by the imaging unit 11. The order of performing of the step S1 and the step S2 is set arbitrary.

In the step S3, the phase contrast image acquired in the step S2 is corrected based on the background image acquired in the step S1. In the step S4, the intensity distribution I(x) near the edge in the phase contrast image being corrected in the step S3 is acquired.

In the step S11, the function S(x) representing the X-ray intensity distribution at the time of the X-ray generation on the target 22 is assumed. The function S(x) being assumed in this case is arbitrary, but is typically a Gaussian function, and further, may be the sum of two or more Gaussian functions whose center positions, peak intensities, or σ are different from each other.

In the step S12, the measured intensity distribution I(x) acquired in the step S4 is fitted with I(x) of the above Formula (3) obtained based on the function being assumed in the step S11 to estimate the parameter of the function assumed in the step S11, thereby evaluating the X-ray focal spot shape.

Figure 8:
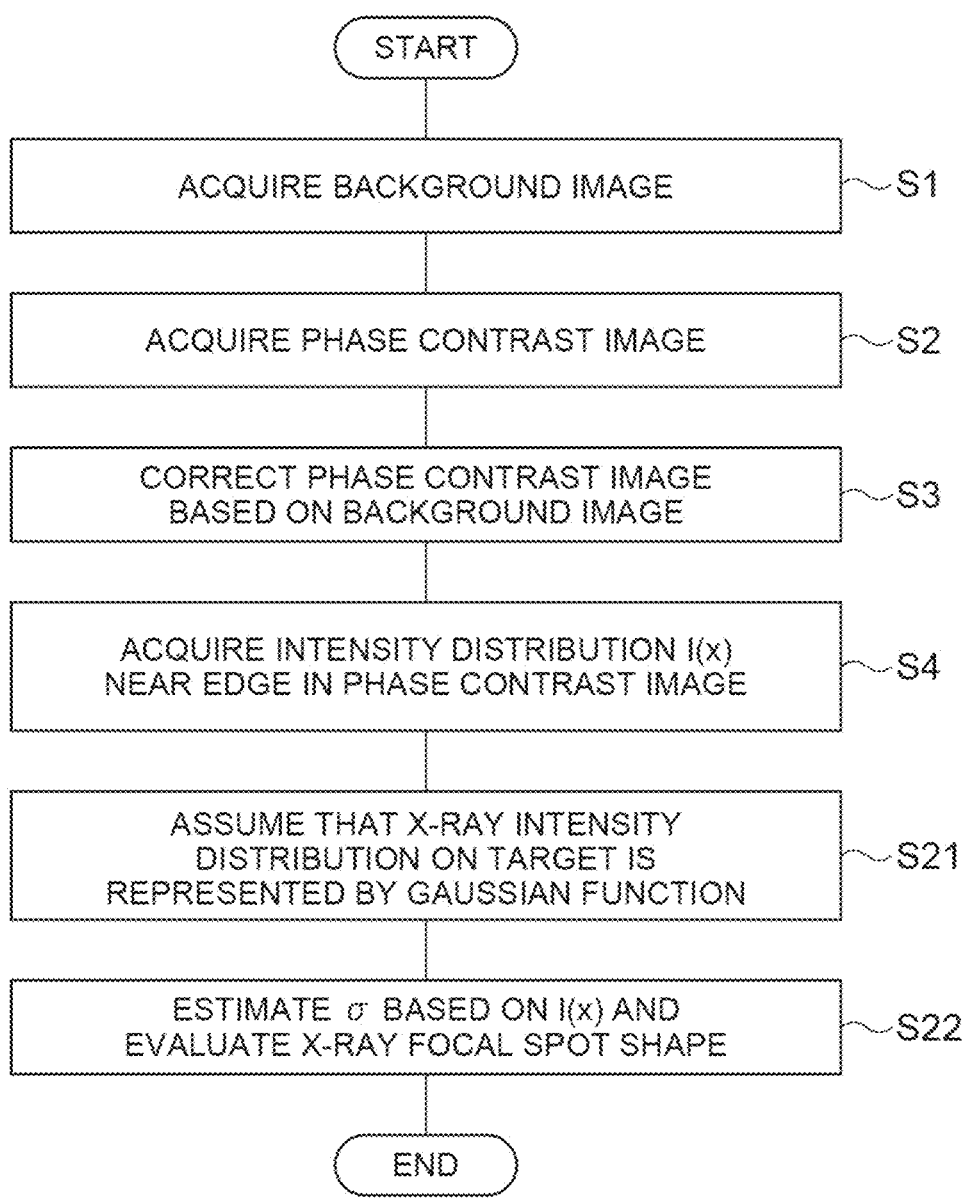
FIG. 8 is a flowchart illustrating a second example of the X-ray focal spot shape evaluation method.

FIG. 8 is a flowchart illustrating a second example of the X-ray focal spot shape evaluation method. The imaging step includes the steps S1 and S2. The operation step includes the steps S3 and S4 and steps S21 and S22. The steps S1 to S4 are the same as those described with reference to FIG. 7.

In the step S21, it is assumed that the function S(x) representing the X-ray intensity distribution at the time of the X-ray generation on the target 22 is a Gaussian function. In the step S22, the measured intensity distribution I(x) acquired in the step S4 is fitted with I(x) of the above Formula (5) obtained when the function S(x) is represented by the above Formula (4) to estimate σ in the above Formula (4), thereby evaluating the X-ray focal spot shape.

Figure 9:
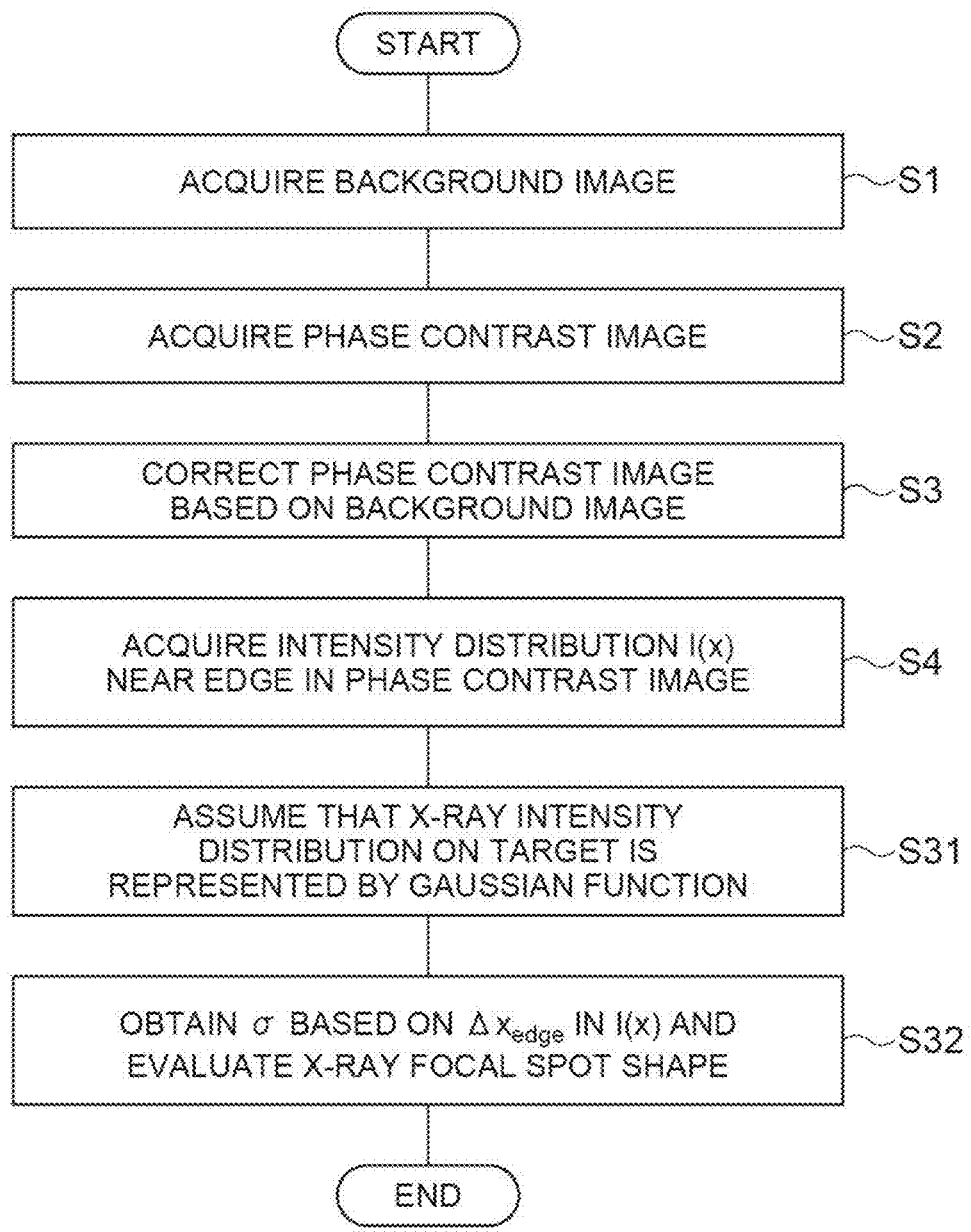
FIG. 9 is a flowchart illustrating a third example of the X-ray focal spot shape evaluation method.

FIG. 9 is a flowchart illustrating a third example of the X-ray focal spot shape evaluation method. The imaging step includes the steps S1 and S2. The operation step includes the steps S3 and S4 and steps S31 and S32. The steps S1 to S4 are the same as those described with reference to FIG. 7.

In the step S31, it is assumed that the function S(x) representing the X-ray intensity distribution at the time of the X-ray generation on the target 22 is a Gaussian function. In the step S32, the distance $\Delta x_{edge}$ between the maximum intensity position $x_a$ and the minimum intensity position $x_b$ in the measured intensity distribution I(x) acquired in the step S4 is obtained, and based on the above $\Delta x_{edge}$, σ in the above Formula (4) is estimated by using the above Formula (6), thereby evaluating the X-ray focal spot shape.

Next, a simulation result will be described. In the simulation, the X-ray energy is set to 10 keV, and the object 30 is set to an aluminum foil having a thickness of 10 μm. It is set to $z_2$=1.6 m, and it is set to M=10. It is assumed that the function S(x) representing the X-ray intensity distribution at the time of the X-ray generation on the target 22 is a Gaussian function. Then, 2σ obtained by the X-ray focal spot shape evaluation method (an example) illustrated in the flowchart of FIG. 9 and 2σ obtained by the measurement method of a comparative example based on the description of Non Patent Document 1 are compared with each other, in the case where the true 2σ is set to each value within the range of 1 to 20 μm.

Figure 10:
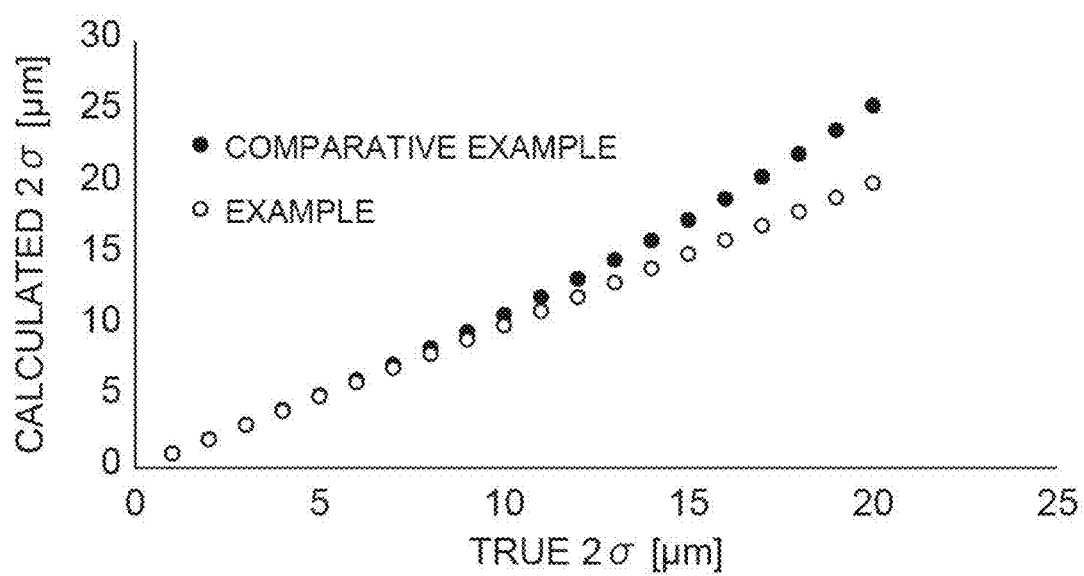
FIG. 10 is a diagram showing and comparing simulation results of an example and a comparative example.

FIG. 10 is a diagram showing and comparing the simulation results of the example and the comparative example. As shown in this diagram, in the comparative example, the calculated 2σ agrees well with the true 2σ in the range where the true 2σ is about 5 μm or less, but the difference from the true 2σ increases as the true 2σ increases.

On the other hand, in the example, the calculated 2σ agrees well with the true 2σ over the entire range where the true 2σ is 1 to 20 μm. The above difference of the simulation results between the example and the comparative example is considered to be due to the fact that, in the comparative example, the values of μ and δ of the object 30 are not considered, and on the other hand, in the example, both the values of μ and δ of the object 30 are considered.

Next, an experimental result will be described. In the experiment, the object 30 is set to a polypropylene film (X-ray transmittance: 99.9% or more) having a thickness of 4 μm. It is set to $z_1$=170 mm, and it is set to $z_2$=1640 mm. As the imaging unit 11, an X-ray CCD camera having a pixel size of 10 μm is used. It is assumed that the function S(x) representing the X-ray intensity distribution at the time of the X-ray generation on the target 22 is a Gaussian function. Then, the focal spot size obtained by the X-ray focal spot shape evaluation method (an example) illustrated in the flowchart of FIG. 9 and the focal spot size obtained by the knife edge method are compared with each other, in the case where a tube voltage and a tube current are set to respective values.

Figure 12:
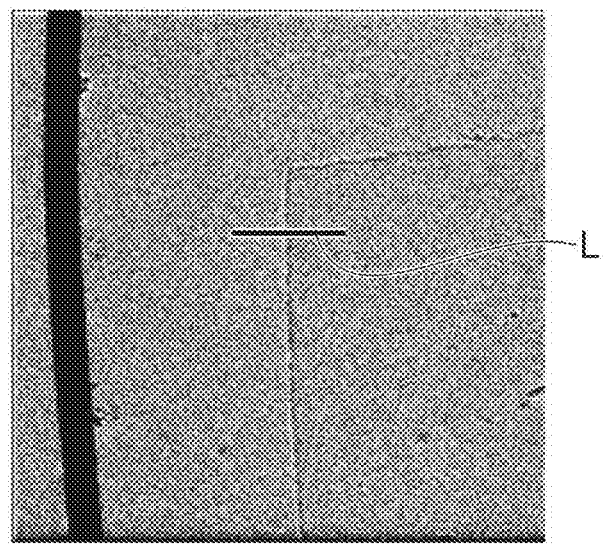
FIG. 12 is a diagram showing the phase contrast image acquired when the tube voltage is set to 20 kV and the tube current is set to 40 μA in an example.
Figure 13:
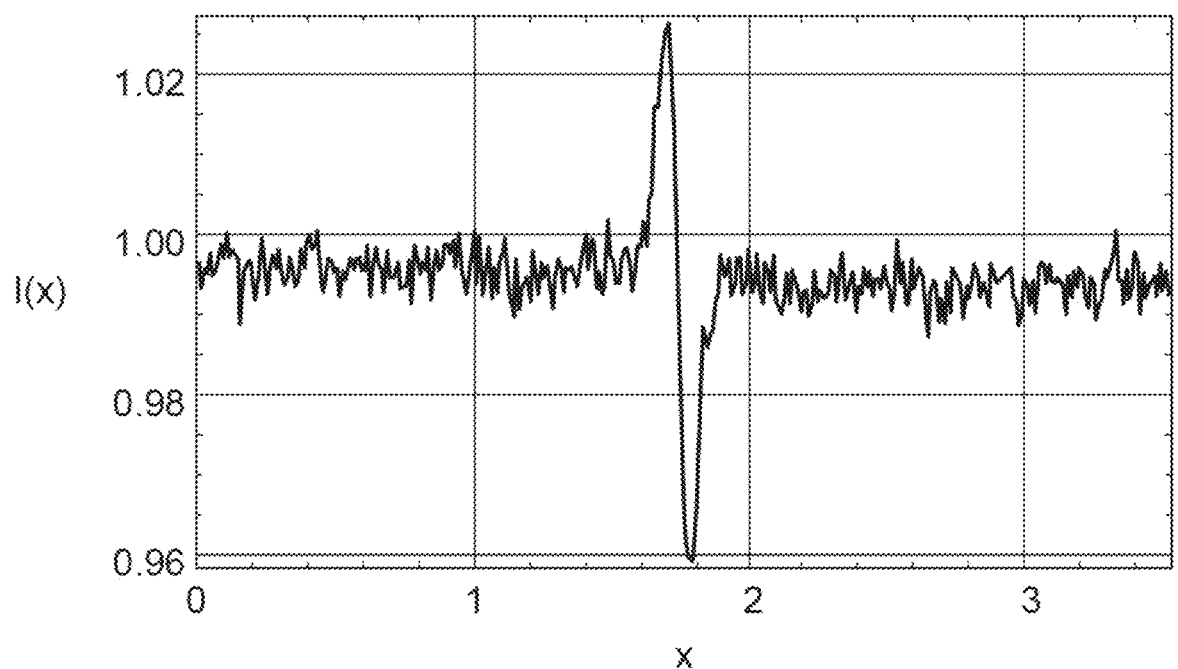
FIG. 13 is a graph showing I(x) acquired from the phase contrast image of FIG. 12.
Figure 14:
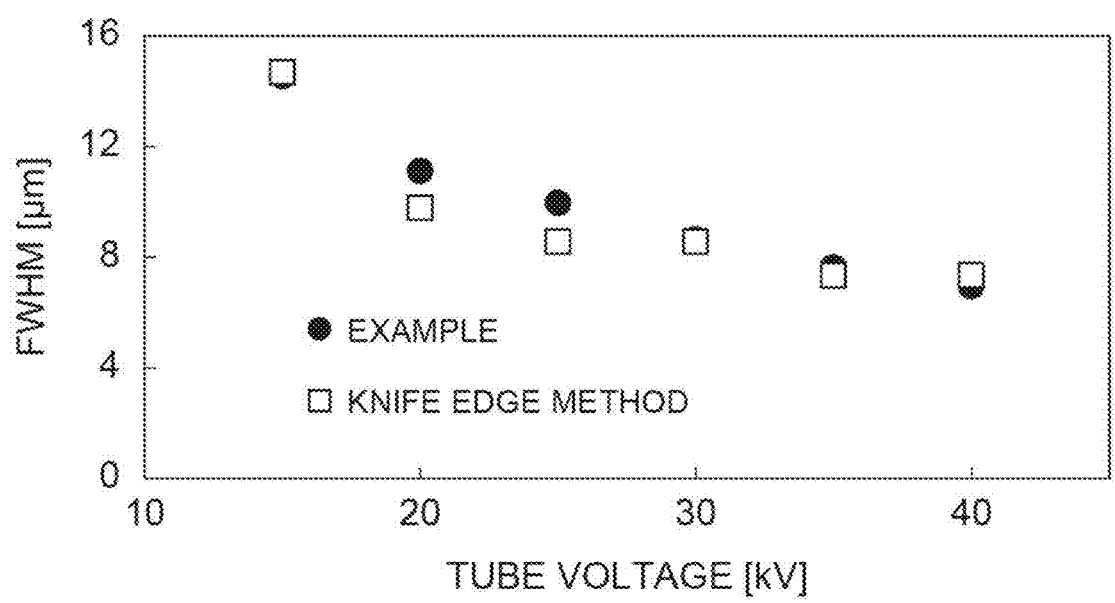
FIG. 14 is a diagram showing and comparing experimental results of the example and a knife edge method.

FIG. 11 is a table showing the tube voltage and the tube current at the time of the experiment. FIG. 12 is a diagram showing the phase contrast image acquired when the tube voltage is set to 20 kV and the tube current is set to 40 μA in the example. FIG. 13 is a graph showing I(x) acquired from the phase contrast image shown in FIG. 12. FIG. 14 is a diagram showing and comparing the experimental results of the example and the knife edge method.

As shown in these diagrams, the measurement result of the focal spot size by the example is in good agreement with the measurement result of the focal spot size by the knife edge method. From the above, it can be understood that the X-ray focal spot shape evaluation method of the present embodiment can obtain the result equivalent to the result of the knife edge method, and the method is appropriate as a method for evaluating the focal spot size.

In the above descriptions, the case in which the edge of the object 30 is set to be parallel to the y direction and the X-ray focal spot shape in the x direction on the target 22 is evaluated is described. In addition, the X-ray focal spot shape in a plurality of directions on the target 22 can also be evaluated by performing the following processes.

In the imaging step, the phase contrast image is acquired by the imaging unit 11 in a state in which the edge of the object 30 is set to each of a plurality of orientations by the holding unit 40, and in the operation step, the X-ray focal spot shape is evaluated by the operation unit 12 based on the phase contrast image of each of the plurality of orientations. (a) to (d) in FIG. 15 are diagrams schematically illustrating the phase contrast images in the case where the orientation of the edge of the object 30 is changed.

Figure 15:
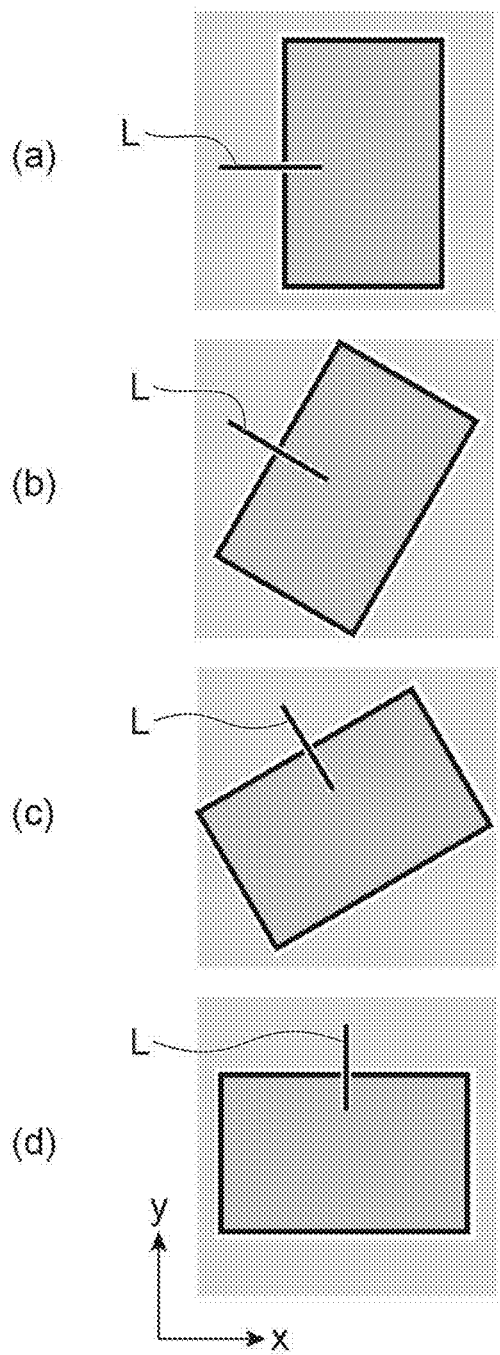
FIG. 15 includes (a)-(d) diagrams schematically illustrating the phase contrast image in the case where an orientation of the edge of an object 30 is changed.

In the phase contrast image illustrated in (a) in FIG. 15, the edge of the object 30 is set to be parallel to the y direction. The intensity distribution I on the straight line L being parallel to the x direction is acquired based on the phase contrast image, and the focal spot shape in the x direction is evaluated based on the intensity distribution I.

In the phase contrast image illustrated in (b) in FIG. 15, the edge of the object 30 is set to be inclined at 30° with respect to the y direction. The intensity distribution I on the straight line L being inclined at 30° with respect to the x direction is acquired based on the phase contrast image, and the focal spot shape in the direction being inclined at 30° with respect to the x direction is evaluated based on the intensity distribution I.

In the phase contrast image illustrated in (c) in FIG. 15, the edge of the object 30 is set to be inclined at 60° with respect to the y direction. The intensity distribution I on the straight line L being inclined at 60° with respect to the x direction is acquired based on the phase contrast image, and the focal spot shape in the direction being inclined at 60° with respect to the x direction is evaluated based on the intensity distribution I.

In the phase contrast image illustrated in (d) in FIG. 15, the edge of the object 30 is set to be parallel to the x direction. The intensity distribution I on the straight line L being parallel to the y direction is acquired based on the phase contrast image, and the focal spot shape in the y direction is evaluated based on the intensity distribution I.

As described above, the phase contrast image is acquired in a state in which the edge of the object 30 is set to each of the plurality of orientations, and the X-ray focal spot shape is evaluated based on the phase contrast image of each of the plurality of orientations, and thus, the X-ray focal spot shape can be evaluated in more detail.

Figure 16:
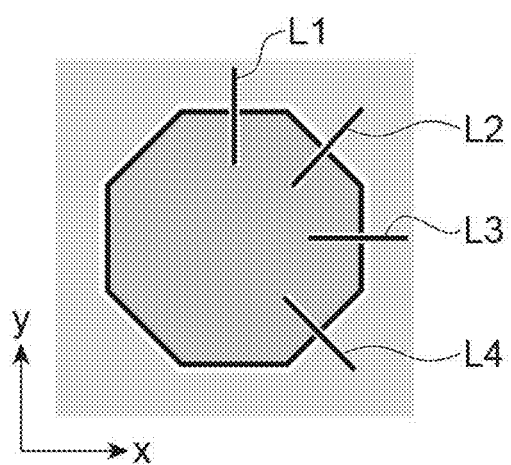
FIG. 16 is a diagram schematically illustrating the phase contrast image in the case where the object 30 has a plurality of edges with orientations different from each other.

In the imaging step, the phase contrast image of the object 30 having a plurality of edges with orientations different from each other is acquired by the imaging unit 11, and in the operation step, the X-ray focal spot shape is evaluated for each of the plurality of edges based on the phase contrast image by the operation unit 12. FIG. 16 is a diagram schematically illustrating the phase contrast image in the case where the object 30 has the plurality of edges whose orientations are different from each other.

The object 30 may be set to, for example, a flat plate shape of a polygonal shape (an octagonal shape in this diagram). In the phase contrast image, the intensity distribution I along each of straight lines L1 to L4 perpendicular to each edge is acquired, and the X-ray focal spot shape in each of directions of the straight lines L1 to L4 is evaluated. By using the above configuration, the X-ray focal spot shape can be evaluated in more detail.

The X-ray focal spot shape evaluation method described with reference to FIG. 15 and FIG. 16 can evaluate the X-ray focal spot shape in the plurality of directions on the target 22, and thus, can evaluate whether the focal spot shape is close to a true circle, or can evaluate an ellipticity of the focal spot shape. In addition, the function F(x, y) of the X-ray intensity distribution on the target 22 can be estimated by using an algorithm described in Patent Document 1. In this method, a point spread function of an optical system is estimated from line spread functions (line integral distribution of the point spread function) of multiple orientations by using a reconstruction algorithm of computed tomography (CT).

As described above, in the present embodiment, an object having a flat plate shape formed of an arbitrary material (for example, a metal foil or a resin film) can be used as the object 30, and the object 30 having the edge can be easily prepared. Further, it is not necessary to dispose the object 30 on the X-ray propagation path with high accuracy, and even when the object 30 having the flat plate shape is disposed to be inclined with respect to the xy plane, the X-ray focal spot size can be appropriately and easily evaluated.

Further, as compared with the measurement method of the comparative example based on the description in Non Patent Document 1, the present embodiment is the same in that the focal spot shape is evaluated based on the phase contrast image, but is different in that the focal spot shape is evaluated in consideration of both the linear attenuation coefficient and the refractive index of the object 30, and thus, the focal spot shape can be evaluated with high accuracy.

As described above, the focal spot shape including the X-ray focal spot size on the target 22 can be easily evaluated. In particular, in the X-ray focal spot shape evaluation method illustrated in the flowchart of FIG. 9, the distance $\Delta x_{edge}$ between the maximum intensity position $x_a$ and the minimum intensity position $x_b$ is obtained in the measured intensity distribution I(x), and σ is estimated based on the above $\Delta x_{edge}$, and thus, the focal spot shape including the X-ray focal spot size can be more easily evaluated.

The apparatus and the method according to the present invention are not limited to the embodiments and configuration examples described above, and various modifications are possible.

The X-ray focal spot shape evaluation apparatus of the above embodiment is an apparatus for evaluating an X-ray focal spot shape on a target of an X-ray source, and includes an imaging unit for acquiring a phase contrast image in a range including an edge of an object disposed on a propagation path of X-rays generated on the target; and an operation unit for evaluating the X-ray focal spot shape based on at least the phase contrast image, a linear attenuation coefficient of the object, and a refractive index of the object.

In the above evaluation apparatus, the imaging unit may acquire the phase contrast image of the object having a flat plate shape.

In the above evaluation apparatus, the imaging unit may acquire a background image in a state in which the object is not disposed on the propagation path, and the operation unit may correct the phase contrast image based on the background image, and may evaluate the X-ray focal spot shape based on the corrected phase contrast image.

In the above evaluation apparatus, the operation unit may assume a function representing an X-ray intensity distribution when the X-rays are generated on the target, may estimate a parameter of the assumed function by fitting an intensity distribution in a direction perpendicular to the edge in the phase contrast image acquired by the imaging unit with an intensity distribution in the direction perpendicular to the edge in the phase contrast image obtained based on the assumed function, and may evaluate the X-ray focal spot shape.

In the above evaluation apparatus, the operation unit may obtain a distance between a maximum intensity position and a minimum intensity position in an intensity distribution in a direction perpendicular to the edge in the phase contrast image acquired by the imaging unit, and may evaluate the X-ray focal spot shape based on the distance.

In the above evaluation apparatus, the imaging unit may acquire the phase contrast image in a state in which the edge of the object is set to each of a plurality of orientations, and the operation unit may evaluate the X-ray focal spot shape based on the phase contrast image of each of the plurality of orientations. Further, the imaging unit may acquire the phase contrast image of the object having a plurality of edges with orientations different from each other, and the operation unit may evaluate the X-ray focal spot shape for each of the plurality of edges based on the phase contrast image.

The X-ray focal spot shape evaluation method of the above embodiment is a method for evaluating an X-ray focal spot shape on a target of an X-ray source, and includes an imaging step of acquiring, by an imaging unit, a phase contrast image in a range including an edge of an object disposed on a propagation path of X-rays generated on the target; and an operation step of evaluating the X-ray focal spot shape based on at least the phase contrast image, a linear attenuation coefficient of the object, and a refractive index of the object.

In the above evaluation method, in the imaging step, the phase contrast image of the object having a flat plate shape may be acquired.

In the above evaluation method, in the imaging step, a background image may be acquired by the imaging unit in a state in which the object is not disposed on the propagation path, and in the operation step, the phase contrast image may be corrected based on the background image, and the X-ray focal spot shape may be evaluated based on the corrected phase contrast image.

In the above evaluation method, in the operation step, a function representing an X-ray intensity distribution when the X-rays are generated on the target may be assumed, a parameter of the assumed function may be estimated by fitting an intensity distribution in a direction perpendicular to the edge in the phase contrast image acquired by the imaging unit with an intensity distribution in the direction perpendicular to the edge in the phase contrast image obtained based on the assumed function, and the X-ray focal spot shape may be evaluated.

In the above evaluation method, in the operation step, a distance between a maximum intensity position and a minimum intensity position in an intensity distribution in a direction perpendicular to the edge in the phase contrast image acquired by the imaging unit may be obtained, and the X-ray focal spot shape may be evaluated based on the distance.

In the above evaluation method, in the imaging step, the phase contrast image may be acquired in a state in which the edge of the object is set to each of a plurality of orientations, and in the operation step, the X-ray focal spot shape may be evaluated based on the phase contrast image of each of the plurality of orientations. Further, in the imaging step, the phase contrast image of the object having a plurality of edges with orientations different from each other may be acquired, and in the operation step, the X-ray focal spot shape may be evaluated for each of the plurality of edges based on the phase contrast image.

INDUSTRIAL APPLICABILITY

The present invention can be used as an apparatus and a method capable of easily evaluating a focal spot shape including an X-ray focal spot size on a target of an X-ray source.

REFERENCE SIGNS LIST

10—X-ray focal spot shape evaluation apparatus, 11—imaging unit, 12—operation unit, 20—X-ray source, 21—housing, 22—target, 23—window, 30—object, 40—holding unit.

The invention claimed is:

1. An X-ray focal spot shape evaluation apparatus for evaluating an X-ray focal spot shape on a target of an X-ray source, the apparatus comprising:
    an imaging unit configured to acquire a phase contrast image in a range including an edge of an object disposed on a propagation path of X-rays generated on the target; and
    an operation unit configured to evaluate the X-ray focal spot shape based on at least the phase contrast image, a linear attenuation coefficient of the object, and a refractive index of the object.

2. The X-ray focal spot shape evaluation apparatus according to claim 1, wherein the imaging unit is configured to acquire the phase contrast image of the object having a flat plate shape.

3. The X-ray focal spot shape evaluation apparatus according to claim 1, wherein
    the imaging unit is configured to acquire a background image in a state in which the object is not disposed on the propagation path, and
    the operation unit is configured to correct the phase contrast image based on the background image, and evaluate the X-ray focal spot shape based on the corrected phase contrast image.

4. The X-ray focal spot shape evaluation apparatus according to claim 1, wherein the operation unit is configured to assume a function representing an X-ray intensity distribution when the X-rays are generated on the target, estimate a parameter of the assumed function by fitting an intensity distribution in a direction perpendicular to the edge in the phase contrast image acquired by the imaging unit with an intensity distribution in the direction perpendicular to the edge in the phase contrast image obtained based on the assumed function, and evaluate the X-ray focal spot shape.

5. The X-ray focal spot shape evaluation apparatus according to claim 1, wherein the operation unit is configured to obtain a distance between a maximum intensity position and a minimum intensity position in an intensity distribution in a direction perpendicular to the edge in the phase contrast image acquired by the imaging unit, and evaluate the X-ray focal spot shape based on the distance.

6. The X-ray focal spot shape evaluation apparatus according to claim 1, wherein
    the imaging unit is configured to acquire the phase contrast image in a state in which the edge of the object is set to each of a plurality of orientations, and
    the operation unit is configured to evaluate the X-ray focal spot shape based on the phase contrast image of each of the plurality of orientations.

7. The X-ray focal spot shape evaluation apparatus according to claim 1, wherein
    the imaging unit is configured to acquire the phase contrast image of the object having a plurality of edges with orientations different from each other, and
    the operation unit is configured to evaluate the X-ray focal spot shape for each of the plurality of edges based on the phase contrast image.

8. An X-ray focal spot shape evaluation method for evaluating an X-ray focal spot shape on a target of an X-ray source, the method comprising:

performing an imaging of acquiring, by an imaging unit, a phase contrast image in a range including an edge of an object disposed on a propagation path of X-rays generated on the target; and performing an operation of evaluating the X-ray focal spot shape based on at least the phase contrast image, a linear attenuation coefficient of the object, and a refractive index of the object.

9. The X-ray focal spot shape evaluation method according to claim 8, wherein in the imaging, the phase contrast image of the object having a flat plate shape is acquired.

10. The X-ray focal spot shape evaluation method according to claim 8, wherein in the imaging, a background image is acquired by the imaging unit in a state in which the object is not disposed on the propagation path, and in the operation, the phase contrast image is corrected based on the background image, and the X-ray focal spot shape is evaluated based on the corrected phase contrast image.

11. The X-ray focal spot shape evaluation method according to claim 8, wherein in the operation, a function representing an X-ray intensity distribution when the X-rays are generated on the target is assumed, a parameter of the assumed function is estimated by fitting an intensity distribution in a direction perpendicular to the edge in the phase contrast image acquired by the imaging unit with an intensity distribution in the direction perpendicular to the edge in the phase contrast image obtained based on the assumed function, and the X-ray focal spot shape is evaluated.

12. The X-ray focal spot shape evaluation method according to claim 8, wherein in the operation, a distance between a maximum intensity position and a minimum intensity position in an intensity distribution in a direction perpendicular to the edge in the phase contrast image acquired by the imaging unit is obtained, and the X-ray focal spot shape is evaluated based on the distance.

13. The X-ray focal spot shape evaluation method according to claim 8, wherein in the imaging, the phase contrast image is acquired in a state in which the edge of the object is set to each of a plurality of orientations, and in the operation, the X-ray focal spot shape is evaluated based on the phase contrast image of each of the plurality of orientations.

14. The X-ray focal spot shape evaluation method according to claim 8, wherein in the imaging, the phase contrast image of the object having a plurality of edges with orientations different from each other is acquired, and in the operation, the X-ray focal spot shape is evaluated for each of the plurality of edges based on the phase contrast image.

* * * * *